Figure 6:
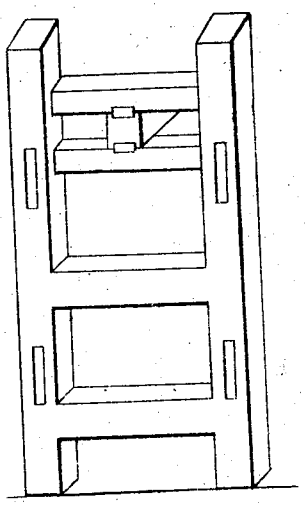
Figure 5:
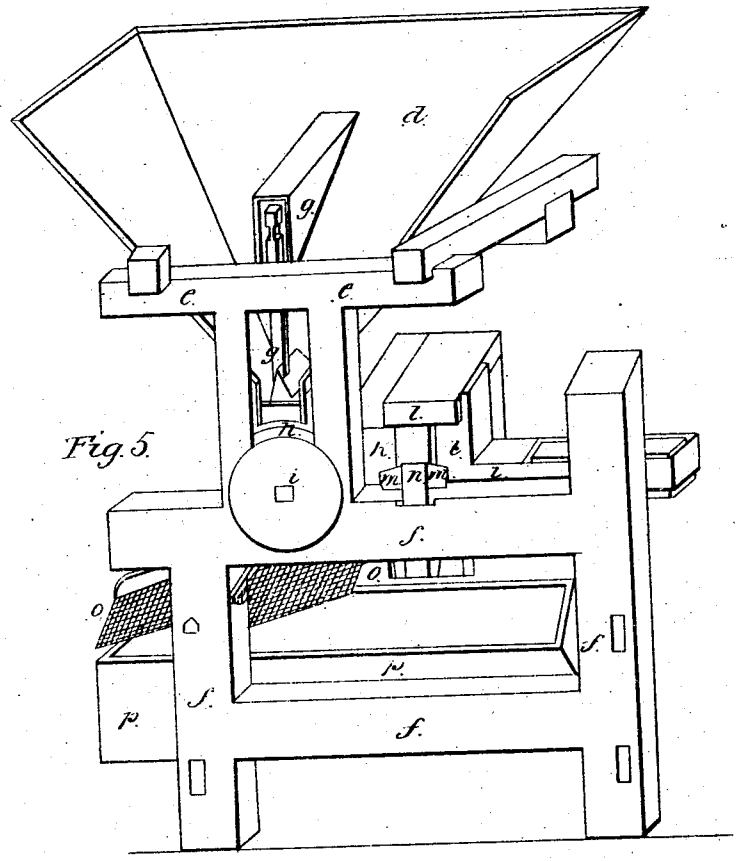

5340X
Sheet 1, 2 Sheets.
F. Follet.
Cotton Seed Huller.
Patented Jan. 21, 1829.
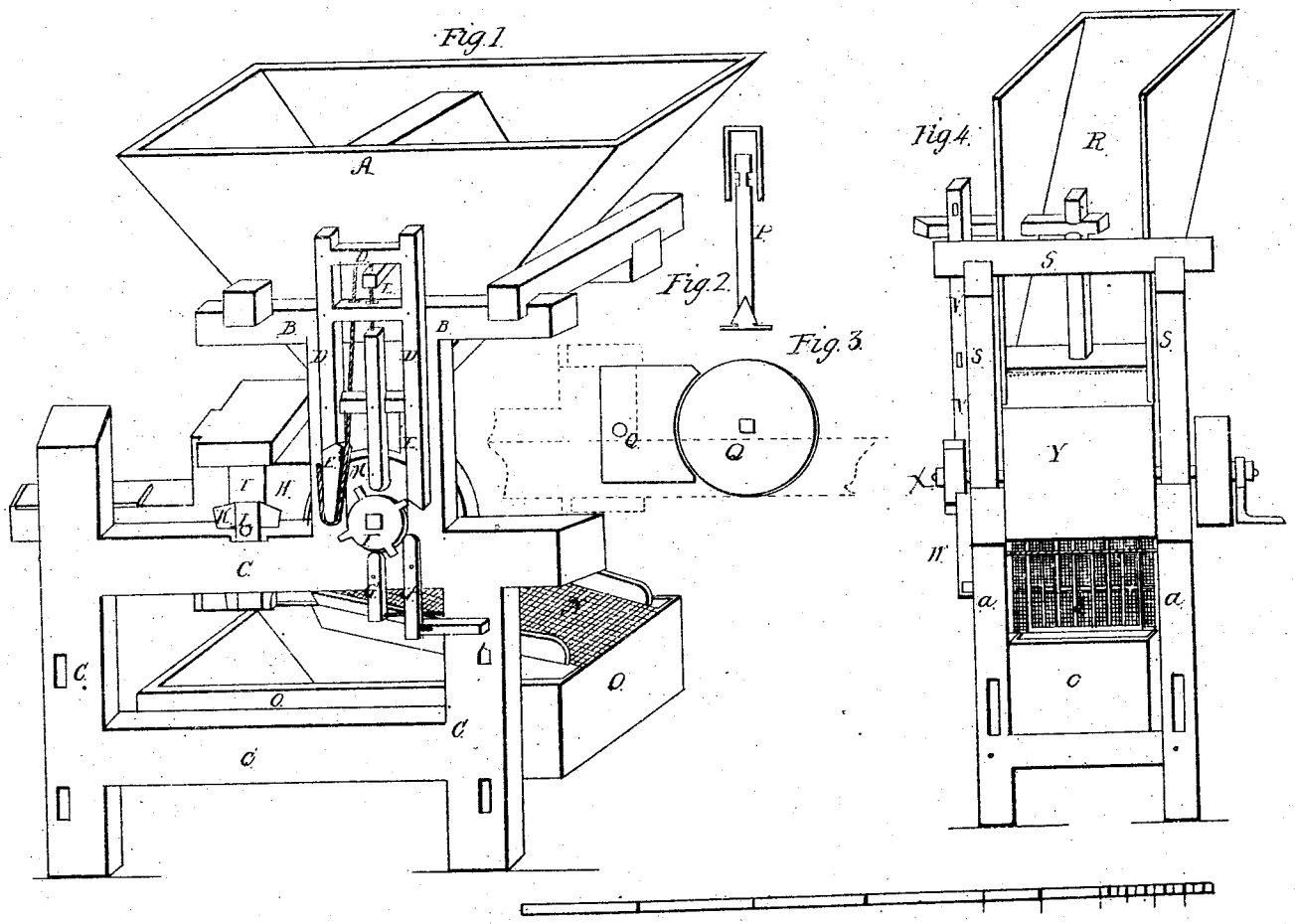

5340X

Sheet 2, 2 Sheets.

F. Follet.

Cotton Seed Huller.

Patented Jan. 21, 1829.

United States Patent Office

PTO - BOYERS, PA Duty Station

MISSING PAGE TEMPORARY NOTICE

PATENT # 5340X FOR ISSUE DATE 1-21-1829

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa